(12) United States Patent
Godecker et al.

(10) Patent No.: US 9,216,825 B2
(45) Date of Patent: Dec. 22, 2015

(54) MULTIPLE ACCESS AIRCRAFT GALLEY CHILLER

(71) Applicant: B/E Aerospace, Inc., Wellington, FL (US)

(72) Inventors: William J. Godecker, Irvine, CA (US); James R. Forbes, Anaheim, CA (US); Michael Kemery, Seattle, WA (US)

(73) Assignee: B/E AEROSPACE, INC., Wellington, FL (US)

( * ) Notice: Subject to any disclaimer, the term of this patent is extended or adjusted under 35 U.S.C. 154(b) by 0 days.

(21) Appl. No.: 14/593,562

(22) Filed: Jan. 9, 2015

(65) Prior Publication Data

US 2015/0115783 A1    Apr. 30, 2015

Related U.S. Application Data

(63) Continuation of application No. 13/859,590, filed on Apr. 9, 2013, now Pat. No. 8,931,857.

(60) Provisional application No. 61/623,967, filed on Apr. 13, 2012.

(51) Int. Cl.
| | |
|---|---|
| *F25D 23/00* | (2006.01) |
| *B64D 11/04* | (2006.01) |
| *B64D 11/00* | (2006.01) |
| *F25D 11/02* | (2006.01) |
| *F25D 23/02* | (2006.01) |
| *F25D 23/12* | (2006.01) |
| *A47B 31/00* | (2006.01) |

(52) U.S. Cl.
CPC ............ *B64D 11/04* (2013.01); *B64D 11/0007* (2013.01); *F25D 11/02* (2013.01); *F25D 23/02* (2013.01); *F25D 23/021* (2013.01); *F25D 23/028* (2013.01); *F25D 23/12* (2013.01); *A47B 2031/002* (2013.01); *B62B 2202/67* (2013.01); *F25D 2400/06* (2013.01)

(58) Field of Classification Search
CPC ...... B64D 11/04; B64D 11/007; F25D 23/02; F25D 23/021; F25D 11/02
See application file for complete search history.

(56) References Cited

U.S. PATENT DOCUMENTS

| | | | | |
|---|---|---|---|---|
| 1,984,977 | A | * | 12/1934 | Mize .............................. 312/276 |
| 1,984,997 | A | | 12/1934 | Smith |

(Continued)

FOREIGN PATENT DOCUMENTS

| | | |
|---|---|---|
| DE | 2530561 A1 | 4/1977 |
| DE | 9314323 U1 | 3/1994 |
| FR | 2835045 A1 | 7/2003 |

OTHER PUBLICATIONS

International Search Report, Jul. 25, 2013, 5 pages, from PCT/US2013/036017, published as WO 2013/155211 on Oct. 17, 2013.

*Primary Examiner* — Daniel Rohrhoff
(74) *Attorney, Agent, or Firm* — Fulwider Patton LLP

(57) ABSTRACT

A chiller for an aircraft galley is disclosed having a housing defining an interior space, the housing including dividers to segregate the interior space into separate chambers. The chambers are enclosed by a pair of doors on a front of the housing that allow a user to gain access to the chambers, a first door providing access to at least one chamber and a second door providing access to at least one different chamber. A side door is also provided that permits access to at least one chamber, wherein at least one chamber is not accessible through said side door.

7 Claims, 2 Drawing Sheets

(56) References Cited

U.S. PATENT DOCUMENTS

| | | | | |
|---|---|---|---|---|
| 2,584,886 A | * | 2/1952 | Laguzzi | 312/405 |
| 2,756,570 A | * | 7/1956 | Gale | 62/331 |
| 2,811,405 A | * | 10/1957 | Formoso | 312/287 |
| 4,123,130 A | * | 10/1978 | Locke | 312/285 |
| 4,725,107 A | * | 2/1988 | Appleton | 312/283 |
| 5,567,026 A | | 10/1996 | Lacewell | |
| 5,765,842 A | | 6/1998 | Phaneuf | |
| 6,079,216 A | * | 6/2000 | de Marsillac Plunkett et al. | 62/56 |
| 6,484,531 B1 | * | 11/2002 | Hambleton et al. | 62/440 |
| 6,655,760 B1 | * | 12/2003 | Sakata et al. | 312/116 |
| 7,197,888 B2 | * | 4/2007 | LeClear et al. | 62/186 |
| 7,780,114 B2 | * | 8/2010 | Doebertin et al. | 244/118.5 |
| 8,160,741 B1 | * | 4/2012 | Shoenfeld | 700/237 |
| 2003/0160547 A1 | | 8/2003 | Desrochers | |
| 2004/0017137 A1 | | 1/2004 | Straub | |
| 2012/0085862 A1 | * | 4/2012 | Pangalila | 244/118.5 |
| 2012/0285335 A1 | | 11/2012 | Cunningham et al. | |
| 2013/0248649 A1 | | 9/2013 | Burd | |
| 2013/0256249 A1 | | 10/2013 | Burd | |
| 2014/0125092 A1 | | 5/2014 | Schreuder et al. | |
| 2014/0238064 A1 | * | 8/2014 | Hawkins et al. | 62/244 |

\* cited by examiner

MULTIPLE ACCESS AIRCRAFT GALLEY CHILLER

CROSS-REFERENCES TO RELATED APPLICATIONS

This application is a continuation based on U.S. Ser. No. 13/859,590, filed on Apr. 9, 2013, which claims priority from U.S. Provisional Application No. 61/623,967, filed Apr. 13, 2012, incorporated fully herein by reference in its entirety.

BACKGROUND

Commercial aircraft are typically equipped with a food and beverage preparation area commonly referred to as a galley. The galley of an aircraft includes equipment to keep perishables from spoiling, as well as equipment for heating food, chilling beverages, cleaning, disposing of waste, and the like. One of the centerpieces of an aircraft galley is the refrigerator, or chiller as they are referred. Refrigeration units are one of the heaviest and most used equipment in the galley, making its location strategic to all of other equipment. A chiller must have readily available access while not inhibiting other equipment, particularly in the close quarters of the aircraft galley. Further, current aircraft chillers lack the ability to have multi-zone cooling for, as an example, ice cream, beverages, and salads, which are preferably all kept at different temperatures. The present invention addresses these shortcomings of conventional aircraft galley chillers.

SUMMARY OF THE INVENTION

An aircraft galley chiller is disclosed having multiple access openings including front, side, and even back or top access via doors and windows. The chiller of the present invention preferably also has multi-zone cooling that can accommodate various items at different temperatures in the same chiller. For example, the front of the chiller could have a compartment that is cooled to −15° C. for ice and/or ice cream, while the side section could be cooled to 8° C. for soft drinks or white wine. Other temperatures and locations are obviously available as well. The compartments can be segregated such that the side door would allow access only to certain items, such as premium items or less frequently requested items. Further, access through the front door(s) in the main galley may be limited to crew access only and contain more controlled items. The rear of the chiller could also be accessible, through a door, sliding panel, or the like. All access points can use various modes, such as hinged doors, sliding panels, etc. Also, each side could include multiple doors depending upon the layout of the chiller.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
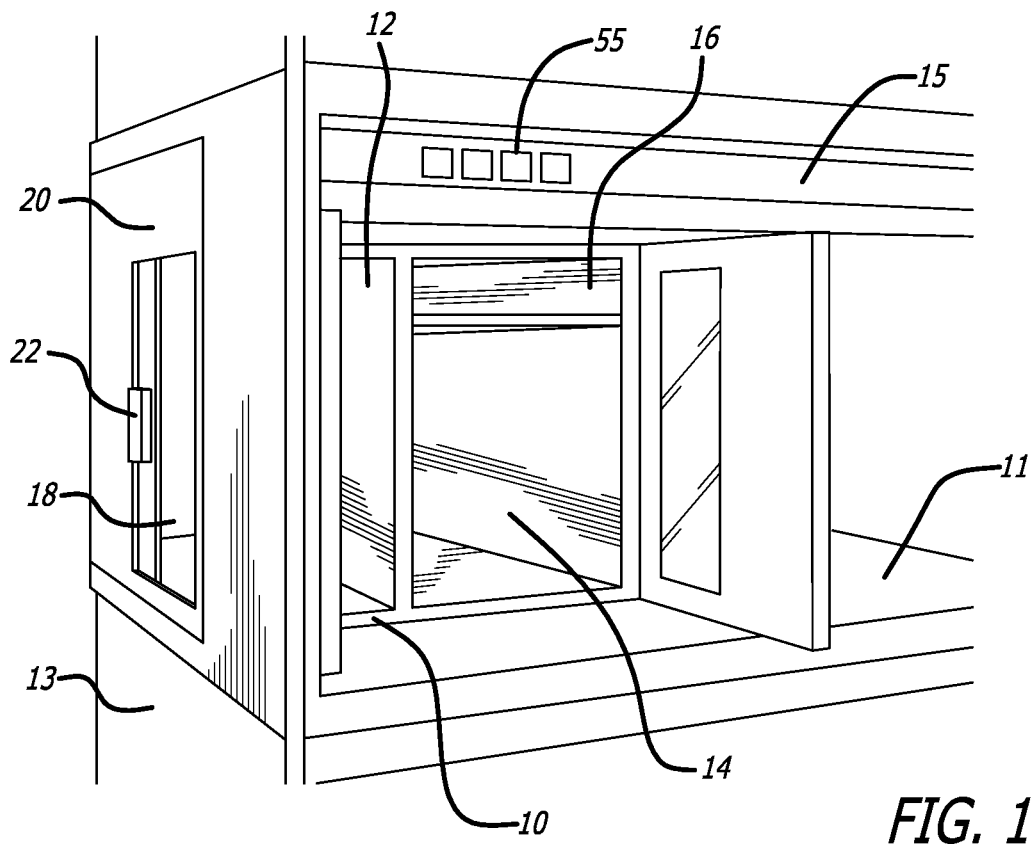
FIG. 1 is an elevated, perspective view of a first embodiment of the present invention.

FIG. 1 illustrates a perspective view of a chiller 10 of the present invention. The chiller 10 rests on a work space 11 that is part of an aircraft galley 13. The galley 13 may include other equipment, including ovens, beverage brewers, trash compactors, lighting, beverage cart stowage compartments, and a variety of other devices and equipment to prepare and serve food and beverages to the passengers. The chiller 10 is used to keep beverages or perishables cold during the flight, and preferably includes multi-zone temperature controls 55 for varying the temperature within the chiller's interior chambers. A set of controls 55 can be found on the upper panel 15 of the chiller for controlling the temperature in the various chambers. The chiller preferably includes an interior that is segregated into three separate chambers, namely a tall top-to-bottom chamber 12 on the left hand side, a larger square chamber 14 on the right hand side, and an upper smaller chamber 16 above the square chamber 14. Of course, various other configurations and shapes are within the scope of the present invention and the chiller is not intended to be limited in any particular manner to a specific shape or arrangement. As shown in FIG. 1, the chiller 10 has side opening 18 that allows access to the adjacent chamber, in this case the top-to-bottom chamber 12, from the side panel 20 using a sliding door 22. Similar sliding doors can be formed on the right hand side to access the chambers on the right or in the rear of the chiller to access any of the chambers.

Figure 2:
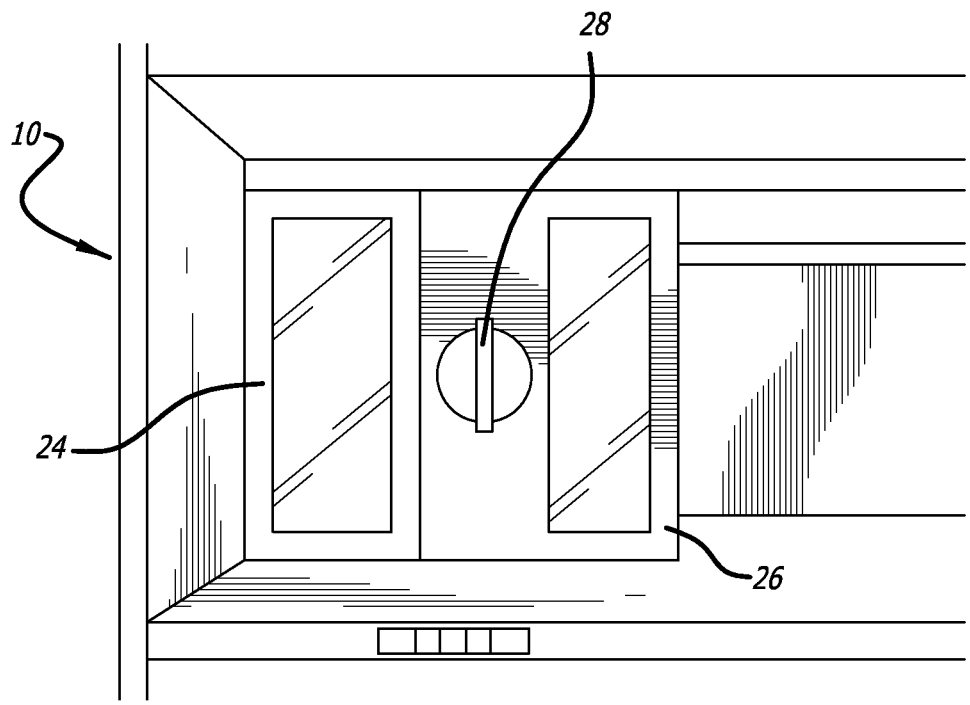
FIG. 2 is a perspective front view of the embodiment of FIG. 1.

FIG. 2 illustrates a front view of the chiller 10, which shows a hinge door 24 securing the top-to-bottom chamber 12, and a second hinge door 26 that secures the square and upper chambers 14,16. The second hinge door 26 is formed with a easy to grasp handle 28, and the two doors 24, 26 preferably swing out like French doors, albeit with different arcs since the doors are different dimensions in this example. Other types of doors and shapes of doors are readily substituted for those shown in FIG. 2.

Figure 3:
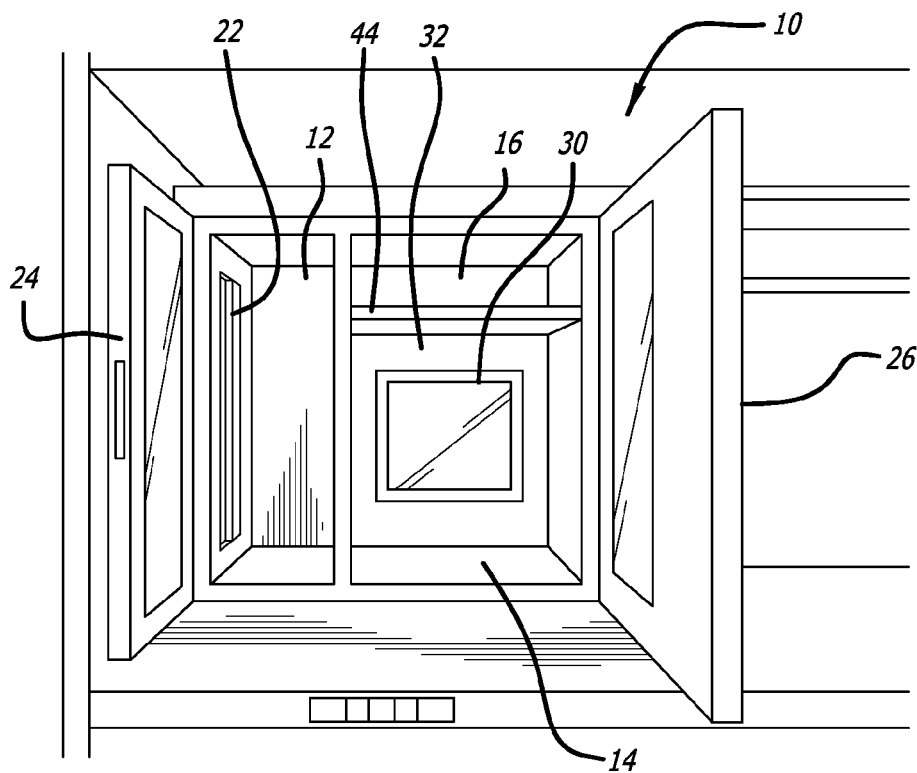
FIG. 3 is another perspective view of the embodiment of FIG. 1 with the doors open.

FIG. 3 illustrates the chiller 10 of FIGS. 1 and 2 with the doors 24,26 open to show the chambers, and show the access through the side door 22 on the left hand side. Note that either front door could be formed with a lock (not shown) to maintain security for more expensive items. The chiller 10 preferably includes slidable racks 44 that can be positioned on rails or grooves on the side walls of the chiller to create sub-spaces for different sized products. Also, a window/door 30 can be provided in the rear wall 32 of the chiller for additional access to the chambers, or in the case of a window viewability of the available items for consumption.

Figure 4:
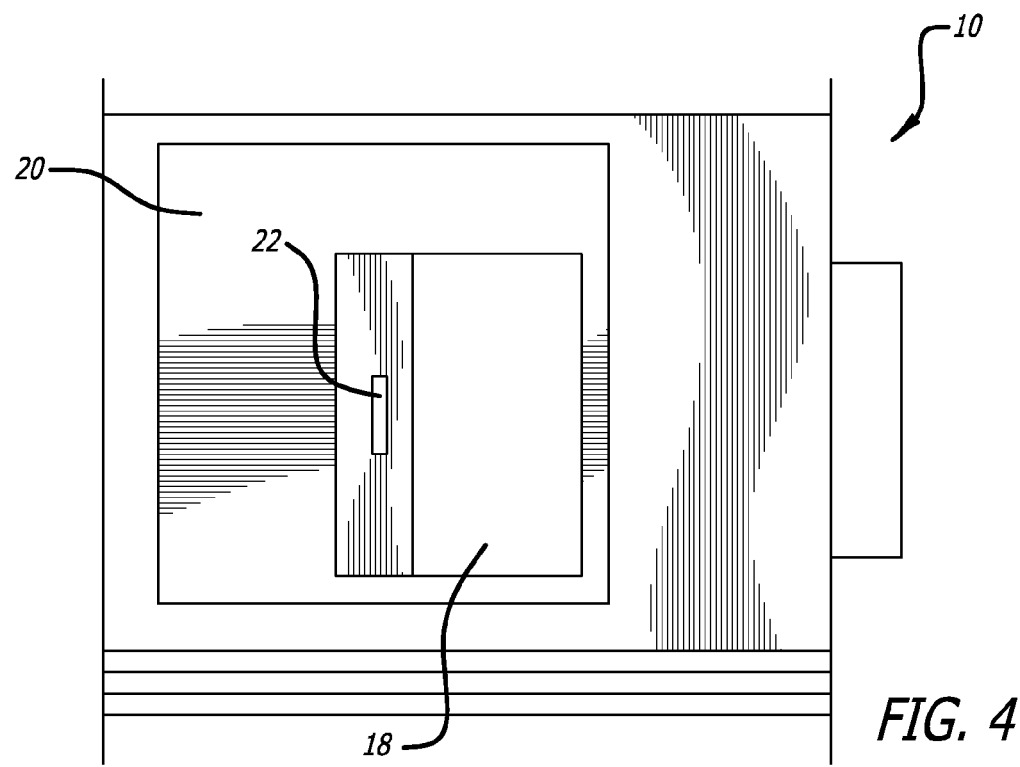
FIG. 4 is a side view of the embodiment of FIG. 1.

FIG. 4 illustrates a side view of the chiller 10 showing the sliding door 22 and the access opening/window 18. This access window 18 and sliding door 22 allow passengers to access the chiller 10 from the aisle of the aircraft, allowing self-service of certain items without granting passengers access to the galley itself or certain chambers within the chiller 10. Soft drinks and certain complimentary items can be stocked in the chamber 12 adjacent the sliding door 22, preferably on adjustable shelves, such that passengers can take a soft drink or other self-serve item but cannot gain access to the other chambers, which may be used to store wines, beers, or other expensive or restricted items.

The present invention includes features that are not found on aircraft galleys, and with the advent of long duration flights and more passenger on-demand services there is an increasing demand for larger and more efficient refrigerated space on board. A chiller of the present invention provides service options not in use today as well allow airlines to develop branding systems around such service. There are a great many passengers that would be attracted to a self-serve beverage center such as the one the chiller of the present invention provides. Also, the chiller can serve different purposes by cooling the chambers at different temperatures. For example, ice cream could be stored in the upper chamber 16 at a chamber temperature of 15 degrees C. whereas the other chambers could be used to chill beverages at 8 degrees C. Other temperature chamber combinations are possible as well.

It will become apparent from the foregoing descriptions that while particular forms of the invention have been illustrated and described, various modifications can be made without departing from the spirit and scope of the invention. Accordingly, it is not intended that the invention be limited, except as by the appended claims.

We claim:

1. A chiller, comprising:
 a chiller housing having horizontal and vertical dividers to segregate the interior space into separate chambers;
  at least one front door on the housing to gain access to the chambers;
  a set of temperature controls for controlling a temperature within each chamber;
  a sliding side door providing access to a first chamber, wherein at least a second chamber is not accessible through said side door;
  a rear door in said chiller housing providing access to the second chamber; and
  a third chamber that is not accessible through said sliding side door or rear door, and is accessible through said at least one front door.

2. The chiller of claim 1, wherein said sliding side door comprises a transparent window that allows visual inspection of the first chamber.

3. The chiller of claim 1, wherein said rear door comprises a transparent window that allows visual inspection of the second chamber.

4. The chiller of claim 1, further comprising removable racks within at least one of the chambers to establish subspaces within a chamber.

5. The chiller of claim 1, wherein at least one of the front door, sliding side door, and rear door, includes a lock.

6. The chiller of claim 1, wherein at least one of the chambers is capable of temperatures below freezing.

7. The chiller of claim 1, wherein the first chamber is enclosed by a separate door than said second chamber.

* * * * *